United States Patent
You et al.

(10) Patent No.: US 6,316,589 B1
(45) Date of Patent: Nov. 13, 2001

(54) POLYIMIDE FOR OPTICAL COMMUNICATIONS

(75) Inventors: Kyung-Hee You; Kwan-Soo Han, both of Seoul; Tae-Hyung Rhee, Sungnam, all of (KR)

(73) Assignee: SamSung Electronics Co., Ltd, Suwon (KR)

( * ) Notice: Subject to any disclaimer, the term of this patent is extended or adjusted under 35 U.S.C. 154(b) by 0 days.

(21) Appl. No.: 09/547,312

(22) Filed: Apr. 11, 2000

(30) Foreign Application Priority Data

Apr. 14, 1999 (KR) ................................................. 99/13153

(51) Int. Cl.$^7$ ............................. C08G 73/10; C08G 69/26
(52) U.S. Cl. ........................... 528/353; 528/125; 528/126; 528/128; 528/170; 528/172; 528/173; 528/174; 528/176; 528/183; 528/188; 528/220; 528/229; 528/350; 528/351; 524/600; 524/602; 524/606; 427/256; 427/372.2; 264/235; 264/236; 264/338
(58) Field of Search ........................... 528/125, 128, 528/126, 170, 172, 173, 174, 176, 183, 188, 220, 229, 350, 351, 353; 264/338, 235, 236; 427/256, 372.2; 524/600, 602, 606

(56) References Cited

U.S. PATENT DOCUMENTS 4,530,993 * 7/1985 Jinda et al. ........................... 528/188
4,603,061 * 7/1986 St. Clair et al. ...................... 427/162

(List continued on next page.)

FOREIGN PATENT DOCUMENTS

| | | |
|---|---|---|
| 0 454 590 a2 | 10/1991 | (EP) . |
| 0 480 266 A2 | 4/1992 | (EP) . |
| 0 616 234 A2 | 9/1994 | (EP) . |
| 2 330 146A | 4/1999 | (GB) . |
| 4-328503 | 11/1992 | (JP) . |
| 4-328504 | 11/1992 | (JP) . |
| 6-3713 | 1/1994 | (JP) . |
| 8-143666 | 6/1996 | (JP) . |
| 10-48418 | 2/1998 | (JP) . |
| 10-104447 | 4/1998 | (JP) . |

*Primary Examiner*—P. Hampton-Hightower
(74) *Attorney, Agent, or Firm*—Robert E. Bushnell, Esq.

(57) ABSTRACT

A polyimide for optical communications, which is expressed by the formula (1)

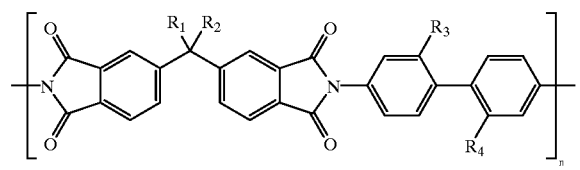

(1)

where $R_1$ and $R_2$ are independently selected from the group consisting of $CF_3$, $CCl_3$, unsubstituted aromatic ring group and halogenerated aromatic ring group; $R_3$ and $R_4$ are independently selected from the group consisting of Cl, F, I, Br, $CF_3$, $CCl_3$, unsubstituted aromatic ring group and halogenated aromatic ring group; and n is an integer from 1 to 39. The polyimides have a superior heat resistance, and can avoid the increase in optical absorption loss due to a refractive index increase and deterioration of adhesive and coating properties due to weak surface tension of a polyimide film. In addition, use of the polyimides as a material for a core layer of optical waveguides can expand the selection range of material for the cladding layer of the optical waveguide.

30 Claims, 1 Drawing Sheet

U.S. PATENT DOCUMENTS

| | | | |
|---|---|---|---|
| 5,108,201 | * | 4/1992 | Matsuura et al. .................... 385/143 |
| 5,233,018 | * | 8/1993 | Ando et al. ........................... 528/353 |
| 5,322,924 | * | 6/1994 | Chuang et al. ....................... 528/353 |
| 5,338,826 | * | 8/1994 | St. Clair et al. ..................... 528/353 |
| 5,572,619 | * | 11/1996 | Maruo et al. ........................ 385/143 |
| 5,649,045 | * | 7/1997 | Fjare et al. .......................... 385/145 |
| 6,037,105 | * | 3/2000 | You et al. ............................ 430/321 |

* cited by examiner

POLYIMIDE FOR OPTICAL COMMUNICATIONS

CLAIM OF PRIORITY

This invention makes reference to, incorporates the same herein, and claims all benefits accruing under 35U.S.C.§119 from an application for POLYIMIDE FOR OPTICAL COMMUNICATION earlier filed in the Korean Industrial Property Office on the of Apr. 14, 1999 is and there duly assigned Ser. No. 99-13153.

BACKGROUND OF THE INVENTION

1. Field of the Invention

The present invention relates to a polyimide for optical communications, and more particularly, to a polyimide for use in manufacturing optical waveguides, which shows low optical absorption loss at wavelengths for optical communications, and has easily controllable refractive index, good solubility in organic solvent and superior processibility.

2. Description of the Related Art

Rapid advances in information industries have increased the demand for optical materials for use in manufacturing main optical devices associated with future generation high-speed and large-amount information communications business, such as optical power dividers, optical wavelength dividers and the like. At the early stage of research into optical materials, inorganic compounds such as lithium niobate ($LiNbO_3$) were used as an optical material. However, inorganic compounds such as this inherently have difficulties in preparation and further processing, and thus are not suitable for mass production. For this reason, attention has shifted from inorganic compounds as optical materials to organic optical materials, in particular, polymers, which are more attractive in terms of the cost, processibility and mass production, and this has boosted research into organic optical materials.

However, common polymers absorb light in the near infrared wavelength range of 1,000 to 1,700 nm due to overtone of harmonics by stretching and deformation vibrations of carbon and hydrogen (C—H) bonds. In order to reduce the optical absorption loss, a method for substituting hydrogen of the carbon and hydrogen bonds by fluorine (F) or deuterium (D) has been considered.

However, C—D bonds formed by the substitution of hydrogen by deuterium causes light absorption at a wavelength of 1550 nm, and thus this substitution technique is not appropriate for optical communications materials that utilize light in the near infrared wavelength range of 1,000 to 1,700 nm. Meanwhile, the substitution of hydrogen by fluorine has been verified as yielding an optical material capable of minimizing the optical absorption loss at a wavelength of 1000 to 1700 nm.

Polyimide has been widely known as a semiconductor protective buffering material due to its thermal and mechanical stabilities. Recently, the fluorine substitution technique has been adapted to polyimide having good physical properties to produce low-optical loss optical communications materials.

Optical waveguides consist of a core layer as a light waveguide, and a cladding layer surrounding the core layer, wherein the core layer must have a higher refractive index than the cladding layer. When a fluorine-substituted polyimide is used in the manufacture of optical waveguides, a fluorine-containing monomer and a non-fluorine-containing monomer must be copolymerized in an appropriate mixing ratio to adjust the fluorine content in the resultant polymer, such that the requirement associated with the refractive index of the core and cladding layers is met.

The fluorine content of a polyimide is generally proportional to a decease in refractive index. Accordingly, as the hydrogen of carbon-hydrogen bonds in a polyimide is substituted by fluorine, the refractive index of the polyimide decreases. Thus, use of such a fluorine-substituted polyimide as a material for a core layer narrows the selection range of materials for the cladding layer thereof. Also, in a case where the same polymer is used for both core and cladding layers, the fluorine content of the polymer must be reduced for core layer having a higher refractive index than the cladding layer, which causes optical absorption loss due to the increased carbon-hydrogen bonds. Also, a higher fluorine content in polymer decreases its surface tension, so that use of the fluorinated polyimide as a material for core and cladding layers degrades their adhesion strength and coating properties.

SUMMARY OF THE INVENTION

It is therefore an object of the present invention to provide an improved polyimide composition for use in optical communication.

It is a further object of the invention to provide a polyimide which avoids increasing optical absorption associated with increasing refractive index.

It is a yet further object of the invention to provide a polyimide with improved adhesion strength and coating properties.

It is a still further object of the invention to provide a polyimide with superior heat resistance.

The above objective of the present invention is achieved by a polyimide for optical communications, expressed by the formula (1)

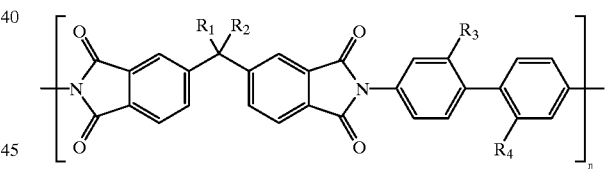

(1)

where $R_1$ and $R_2$ are independently selected from the group consisting of $CF_3$, $CCl_3$, unsubstituted aromatic ring group and halogenerated aromatic ring group; $R_3$ and $R_4$ are independently selected from the group consisting of Cl, F, I, Br, $CF_3$, $CCl_3$, unsubstituted aromatic ring group and halogenated aromatic ring group; and n is an integer from 1 to 39.

For $R_1$, $R_2$, $R_3$ and $R_4$ of the formula (1), the unsubstituted aromatic ring group may include phenyl group, naphthyl group and biphenyl group, and the halogenated aromatic ring group may include 4-chlorophenyl group, 4-fluorophenyl group, 4-trifluoromethylphenyl group and 4-trichloromethylphenyl group. Aromatic carbon-hydrogen (C—H) bonds within the unsubstituted or halogenated aromatic ring group show less optical absorption loss compared to aliphatic carbon-hydrogen bonds, and thus the polyimide having the formula (1) is useful as an optical material for optical communications.

In one embodiment, $R_1$, $R_2$, $R_3$ and $R_4$ of the formula (1) are the same as $CF_3$, which results in the compound having the formula (E) hereinbelow. In another embodiment, $R_1$ and $R_2$ of the formula (1) are the same as $CF_3$, and $R_3$ and $R_4$ are the same as Cl, which results in the compound having the formula (F) hereinbelow.

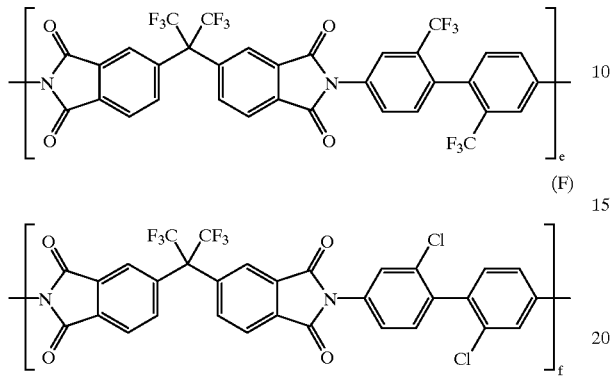

In the formulas (E) and (F), e and f are each independently integers from 1 to 39.

Preferably, the polyimides having the formulas (E) and (F) have a refractive index of 1.5179 to 1.5714 in a transverse electric (TE) mode and of 1.5076 to 1.5590 in a transverse magnetic (TM)c mode at a wavelength of 1,550 nm.

In another embodiment, the present invention provides a polyimide for optical communications, expressed by the formula (2):

group, 4-fluorophenyl group, 4-trifluoromethylphenyl group and 4-trichloromethylphenyl group.

In one embodiment, Z of the formula (2) is

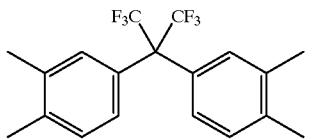

and $R_3$ and $R_4$ are Cl, which results in the compound having the formula (G) hereinbelow. In another embodiment, Z of the formula (2) is the same as

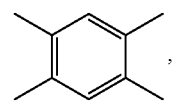

and $R_3$ and $R_4$ are the same as Cl, which results in the compound having the formula (M) hereinbelow.

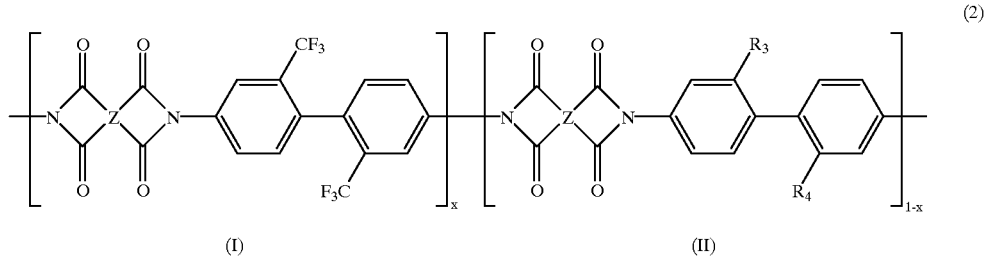

where Z may be

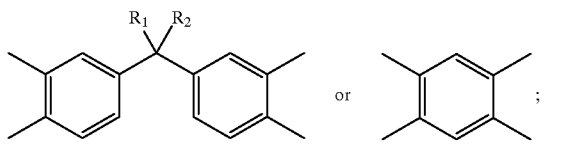

$R_3$ and $R_4$ are independently selected from the group consisting of Cl, F, I, Br, $CF_3$, $CCl_3$, unsubstituted aromatic ring group and halogenated aromatic ring group; $R_1$ and $R_2$ are independently selected from the group consisting of $CF_3$, $CCl_3$, unsubstituted aromatic ring group and halogenerated aromatic ring group; x represents a mole fraction in the range of 0<x<1.

As for $R_1$, $R_2$, $R_3$ and $R_4$ of the formula (2) hereinabove, the unsubstituted aromatic ring group may include phenyl group, naphthyl group and biphenyl group, and the halogenated aromatic ring group may include 4-chlorophenyl

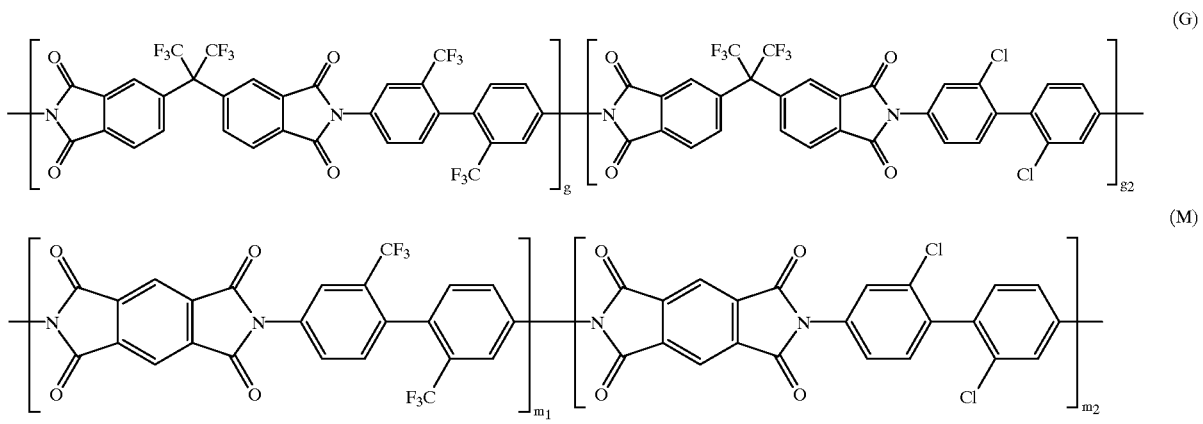

In the formulas (G) and (M), $g_1$ and $g_2$ are independently an integer from 1 to 39, and $m_1$ and $m_2$ are independently an integer from 1 to 39.

Preferably, the polyimide having the formula (G) has a refractive index of 1.5176 to 1.5714 in a TE mode and of 1.5076 to 1.5590 in a TM mode at a wavelength of 1,550 nm. The polyimide having the formula (M) may have a refractive index of 1.6021 to 1.7213 in a transverse magnetic mode and of 1.4930 to 1.5773 in a transverse electric mode at a wavelength of 1,550 nm.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DESCRIPTION OF THE PREFERRED EMBODIMENTS

Figure 1:
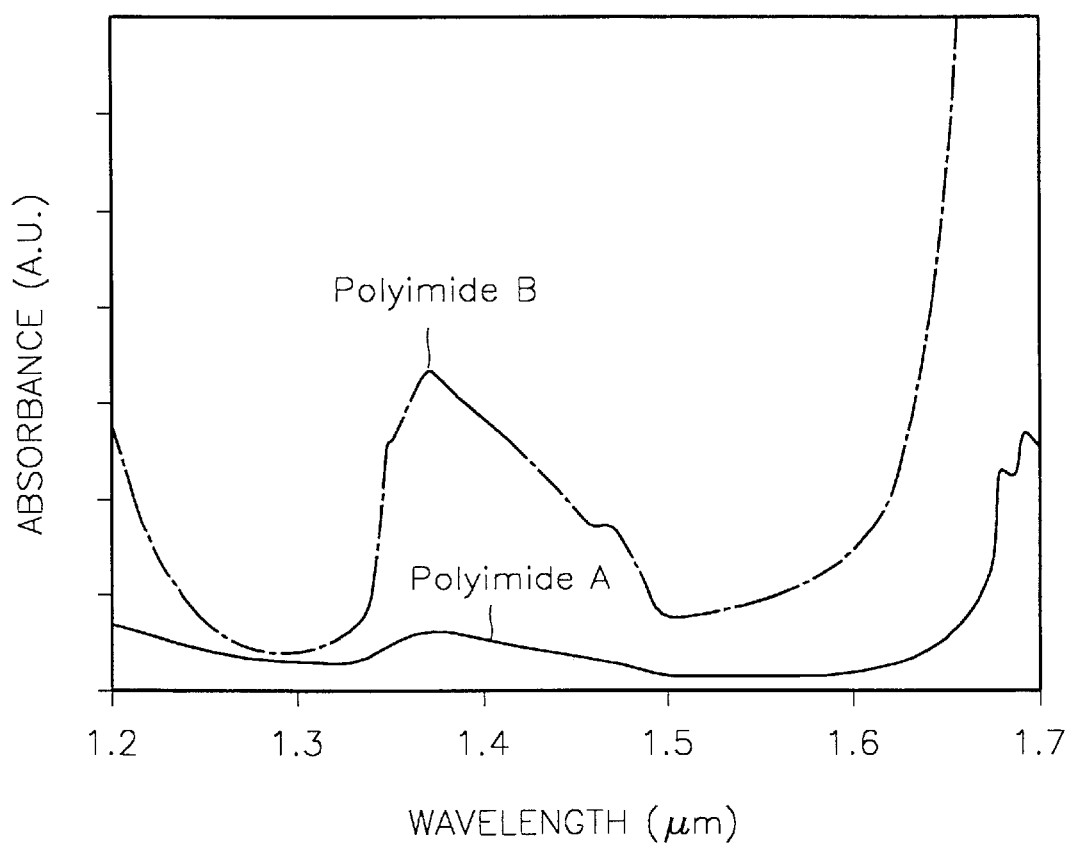
FIG. 1 comparatively illustrates infrared absorption spectra of the polyimide prepared in Example 2 according to the present invention and a conventional polyimide.

The polyimide having the formula (1A) hereinbelow according to the present invention can be derived from acid anhydride (A) and diamine compound (B). Initially, acid anhydride (A) and diamine compound (B) are dissolved in an organic solvent and reacted to obtain polyamic acid. Then, the polyamic acid is subjected to imidization to give the polyimide according to the present invention.

and halogenerated aromatic ring group; $R_3$ and $R_4$ are independently selected from the group consisting of Cl, F, I, Br, $CF_3$, $CCl_3$, unsubstituted aromatic ring group and halogenated aromatic ring group; and n is an integer from 0 to 38. For $R_1$, $R_2$, $R_3$ and $R_4$ of the formula (1A), the unsubstituted aromatic ring group may include phenyl group, naphthyl group and biphenyl group, and the halogenated aromatic ring group may include 4-chlorophenyl group, 4-fluorophenyl group, 4-trifluoromethylphenyl group and 4-trichloromethylphenyl group. In formula (1A), the compound can be seen to be a condensation product of one molecule of acid anhydride and diamine when n=0.

The polymer may also be viewed as having the formula shown in formula (1), with n equal to 1 to 39.

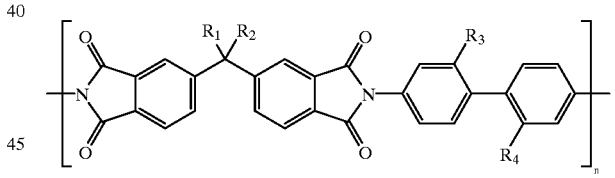

Imidization of the polyamic acid into apolyimide can be carried out by a chemical or thermal technique under standard reaction conditions.

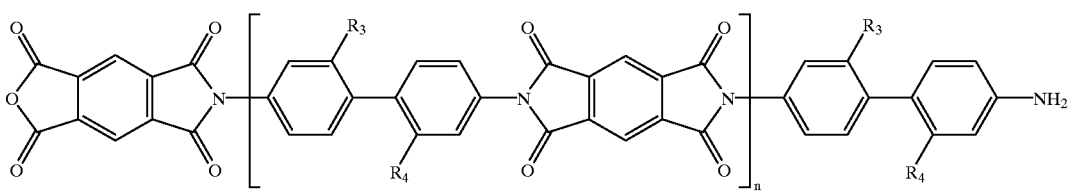

where $R_1$ and $R_2$ are independently selected from the group consisting of $CF_3$, $CCl_3$, unsubstituted aromatic ring group

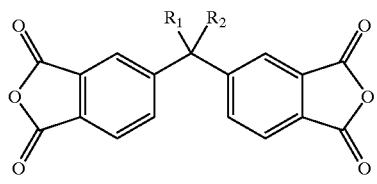

(A)

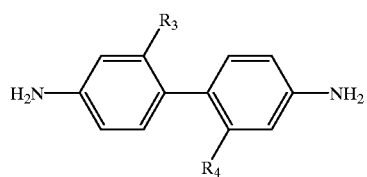

(B)

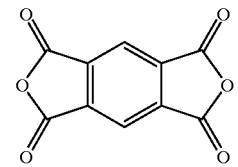

(C)

In the above formulas (A) and (B), $R_1$ and $R_2$ are independently selected from the group consisting of $CF_3$, $CCl_3$, unsubstituted aromatic ring group and halogenated aromatic ring group; $R_3$ and $R_4$ are independently selected from the group consisting of Cl, F, I, Br, $CF_3$, $CCl_3$, unsubstituted aromatic ring group and halogenated aromatic ring group.

For a chemical method for the imidization, to the mixture of acid anhydride (A) and diamine compound (B) are added acetic acid anhydride and pyridine and the mixture is heated at a temperature of 60 to 150° C. Otherwise, toluene is added to the mixture containing acid anhydride (A) and diamine compound (B), and heated to the boiling point of toluene. For a thermal method, the polyamic acid is heated in steps within a range of 50 to 400° C.

Diamine compound (B) is prepared by the following method. Initially, 1-substituted-3-nitrobenzene is dissolved in a solvent and sodium hydroxide and ethylene glycol are added to the solution to obtain an azo compound by reduction. Then, the azo compound is subjected to further reduction to give diamine compound (B).

Preferably, the polyimide mixture having the formula (1A) hereinabove has a weight-averaged molecular weight of 10,000 to 50,000, as measured by gel permeation chromatography. Polyimides with this property show better characteristics in terms of optical absorption loss, processibility and adhesive properties.

Alternatively, a polyimide copolymer can be synthesized by reacting either acid anhydride (A) or (C) with two different diamine compounds of general formula (B).

The polyimide copolymer is shown in formula (2). The polyimide copolymer can be viewed as containing the two units shown the formula (2A). In a composition of the polyimide copolymer, the mole ratio of the two units may vary depending on the mixing ratio of the two diamine compounds used.

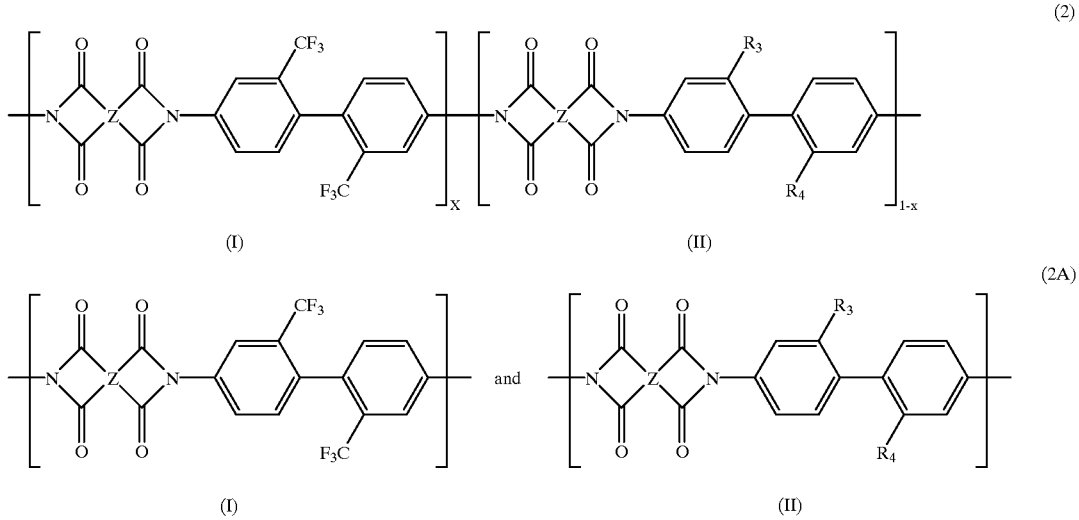

where Z may be

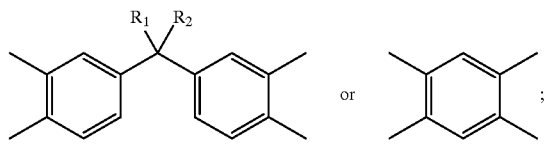

$R_3$ and $R_4$ are independently selected from the group consisting of Cl, F, I, Br, $CF_3$, $CCl_3$, unsubstituted aromatic ring group and halogenated aromatic ring group; $R_1$ and $R_2$ are independently selected from the group consisting of $CF_3$, $CCl_3$, unsubstituted aromatic ring group and halogenated aromatic ring group.

As for $R_1$, $R_2$, $R_3$ and $R_4$ of the formula (2) hereinabove, the unsubstituted aromatic ring group may include phenyl group, naphthyl group and biphenyl group, and the halogenated aromatic ring group may include 4-chlorophenyl group, 4-fluorophenyl group, 4-trifluoromethylphenyl group and 4-trichloromethylphenyl group.

The polyimide copolymer indicated by formula (2) is a copolymer of the two shown repeating units. The mole fraction x is expressed as follows, with the degree of polymerization r and s for repeating units (I) and (II), respectively $$x = \frac{r}{(r+s)}$$

The mole fraction x is not limited to a predetermined range, and may be any value between 0 and 1 for a polymer mixture, and thus it may be adjusted according to a desired refractive index. In other words, the refractive index can be controlled by varying the mixing ratio of diamine compounds (B) in the synthesis of polyimide.

The polyimide indicated by formula (2) has wide applications as a material for optical communications, in particularly, as a material for a core layer and a cladding of optical waveguide. The present invention will be described in greater detail by means of the following examples. The following examples are for illustrative purposes and not intended to limit the scope of the invention.

SYNTHESIS EXAMPLE 1

22.06 g of 1-chloro-3-nitrobenzene was added to 175 ml of ethanol mixture containing 60 g of sodium hydroxide and 210 ml of ethyleneglycol and refluxed for 2 hours. After the reaction was completed, 2 l of ice water was added to the reaction mixture to form a precipitate. The obtained precipitate was filtered, dried, and recrystallized with ethanol to obtain 3,3'-dichloroazobenzene.

18 g of the 3,3'-dichloroazobenzene was dissolved in 50 ml of tetrahydrofuran (THF) and 210 ml of acetic acid and 16.8 g of zinc were added to the solution and refluxed. After the reaction was completed, 30 ml of phosphoric acid was added to the reaction mixture and extracted with methylene chloride. 90 ml of hydrochloric acid was added to the extracted methylene chloride layer and neutralized with a brine solution to give 2,2'-dichloro-4,4'-diaminobiphenyl.

SYNTHESIS EXAMPLE 2

22.06 g of 1-bromo-3-nitrobenzene was added to 175 ml of ethanol mixture containing 60 g of sodium hydroxide and 210 ml of ethyleneglycol and refluxed for 2 hours. After the reaction was completed, 2 l of ice water was added to the reaction mixture to form a precipitate. The obtained precipitate was filtered, dried, and recrystallized with ethanol to obtain 3,3'-dibromoazobenzene.

18 g of the 3,3'-dibromoazobenzene was dissolved in 150 ml of THF and 210 ml of acetic acid and 16.8 g of zinc were added to the solution and refluxed. After the reaction was completed, 30 ml of phosphoric acid was added to the reaction mixture and extracted with methylene chloride. Hydrochloric acid was added to the extracted methylene chloride layer and neutralized to give 2,2'-dibromo-4,4'-diaminobiphenyl.

SYNTHESIS EXAMPLE 3

22.06 g of 1-iodo-3-nitrobenzene was added to 175 ml of ethanol mixture containing 60 g of sodium hydroxide and 210 ml of ethyleneglycol and refluxed for 2 hours. After the reaction was completed, 2 l of ice water was added to the reaction mixture to form a precipitate. The obtained precipitate was filtered, dried, and recrystallized with ethanol to obtain 3,3'-diiodoazobenzene.

18 g of the 3,3'-diiodoazobenzene was dissolved in 150 ml of THF and 210 ml of acetic acid and 16.8 g of zinc were added to the solution and refluxed. After the reaction was completed, 30 ml of phosphoric acid was added to the reaction mixture and extracted with methylene chloride. Hydrochloric acid was added to the extracted methylene chloride layer and neutralized to give 2,2'-diiodo-4,4'-diaminobiphenyl.

EXAMPLE 1

7.205 g (0.0225 moles) of 2,2'-bis(trifluoromethyl)-4,4'-diaminobiphenyl (PFMB) and 10 g (0.0225 moles) of 2,2-bis(dicarboxyphenyl)hexafluoropropane dianhydride (FDA) were dissolved in 57.35 g of N,N-dimethylacetamide in a nitrogen atmosphere and stirred for 24 hours.

After the reaction was completed, work-up procedures were carried out to give a polyamic acid solution. The polyamic acid solution was spin coated on a silicon wafer and heated on a hot plate at 100° C. for 30 minutes, at 200° C. for 1 hour and then at 350° C. for 1 hour, resulting in a completed polyimide film having polymers having the formula shown in formula (E):

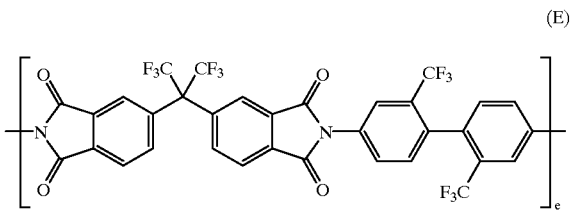

(E)

where e is an integer from 1 to 39.

EXAMPLE 2

0.9 g (0.035 moles) of 2,2'-dichloro-4,4'-diaminobiphenyl (DCB) and 1.577 g (0.0355 moles) of FDA were dissolved in 16.5 g of N,N-dimethylacetamide in a nitrogen atmosphere and stirred for 24 hours.

After the reaction was completed, work-up procedures were carried out to give a polyamic acid solution. The polyamic acid solution was spin coated on a silicon wafer and heated on a hot plate at 100° C. for 30 minutes, at 200° C. for 1 hour and then at 350° C. for 1 hour, resulting in a completed polyimide film containing polymers having the following formula (F)

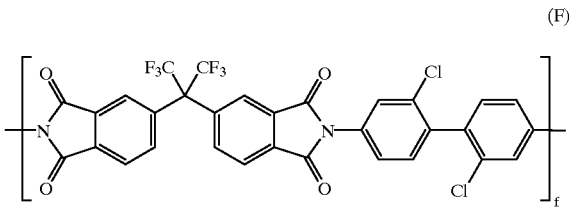

(F)

where f is an integer from 1 to 39.

EXAMPLE 3

3.204 g (0.01 moles) of FDA, 2.561 g (0.008 moles) of PFMB and 0.051 g (0.002 moles) of DCB, where a mixing ratio of PFMB and DCB was 8:2, were dissolved in 44.0 g of N,N-dimethylacetamide in a nitrogen atmosphere and stirred for 24 hours.

After the reaction was completed, work-up procedures were carried out to give a polyamic acid solution. The polyamic acid solution was spin coated on a silicon wafer and heated on a hot plate at 100° C. for 30 minutes, at 200° C. for 1 hour and then at 350° C. for 1 hour, resulting in a completed polyimide film having polymers of the following formula (G)

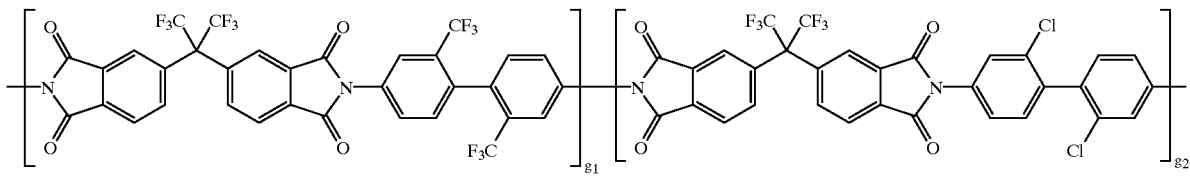

where $g_1$ and $g_2$ sum to an integer from 2 to 39. Here, formula (G) represents a random copolymer.

EXAMPLE 4

The process of EXAMPLE 3 were followed except that 3.2024 g (0.01 moles) of FDA, 1.9213 g (0.006 moles) of PFMB and 0.1028 g (0.004 moles) of DCB were used, where the mixing ratio of PFMB and DCB was 6:4, resulting in a polyimide film having the formula (G) hereinabove.

EXAMPLE 5

The process of EXAMPLE 3 were followed except that 3.2024 g (0.01 moles) of FDA, 1.2809 g (0.004 moles) of PFMB and 0.1543 g (0.006 moles) of DCB were used, where the mixing ratio of PFMB and DCB was 4:6, resulting in a polyimide film having the formula (G) hereinabove.

EXAMPLE 6

The process of EXAMPLE 3 were followed except that 3.2024 g (0.01 moles) of FDA, 0.6404 g (0.002 moles) of PFMB and 0.2057 g (0.008 moles) of DCB were used, where the mixing ratio of PFMB and DCB was 2:8, resulting in a polyimide film having the formula (G) hereinabove.

EXAMPLE 7

7.205 g (0.0225 moles) of PFMB, 4.9808 g (0.0225 moles) of 1,2,4,5-benzenetetracarboxylic dianhydride (also known as pyromellitic dianhydride (PMDA)) were dissolved in 40.38 g of N,N-dimethylacetamide in a nitrogen atmosphere and stirred for 24 hours.

After the reaction was completed, work-up procedures were carried out to give a polyamic acid solution. The polyamic acid solution was spin coated on a silicon wafer and heated on a hot plate at 100° C. for 30 minutes, at 200° C. for 1 hour and then at 350° C. for 1 hour, resulting in a completed polyimide film containing polymers having the following formula (K)

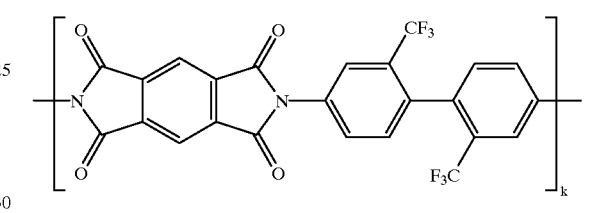

where k is an integer from 1 to 39.

EXAMPLE 8

0.9 g (0.035 moles) of DCB and 7.634 g (0.035 moles) were dissolved in 28.45 g of N,N-dimethylacetamide in a nitrogen atmosphere and stirred for 24 hours.

After the reaction was completed, work-up procedures were carried out to give a polyamic acid solution. The polyamic acid solution was spin coated on a silicon wafer and heated on a hot plate at 100° C. for 30 minutes, at 200° C. for 1 hour and then at 350° C. for 1 hour, resulting in a completed polyimide film having the following formula (L)

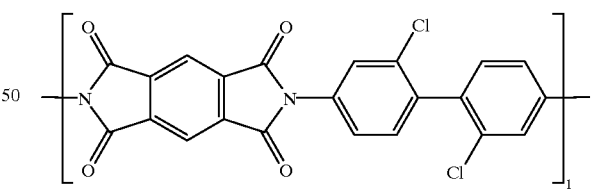

where l is an integer from 1 to 39.

EXAMPLE 9

2.181 g (0.01 moles) of PMDA, 2.5618 g (0.008 moles) of PFMB and 0.0514 g (0.002 moles) of DCB, where amixingratio of PFMB and DCB was 8:2, were dissolved in 17.50 g of N,N-dimethylacetamide in a nitrogen atmosphere and stirred for 24 hours.

After the reaction was completed, work-up procedures were carried out to give a polyamic acid solution. The polyamic acid solution was spin coated on a silicon wafer and heated on a hot plate at 100° C. for 30 minutes, at 200°

C. for 1 hour and then at 350° C. for 1 hour, resulting in a completed polyimide film having the following formula (M)

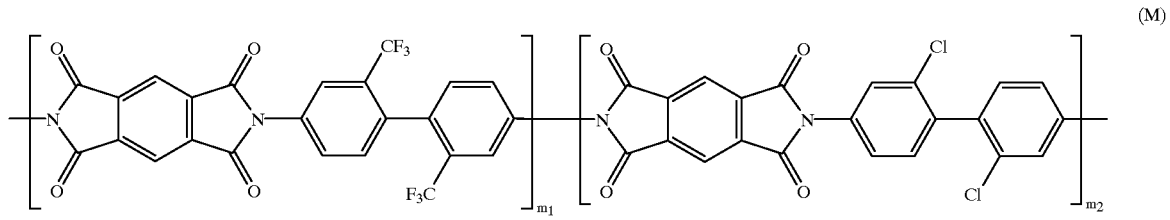

(M)

where $m_1$ and $m_2$ sum to an integer from 2 to 39.

EXAMPLE 10

The process of EXAMPLE 9 was followed except that 2.181 g (0.01 moles) of PMDA, 1.9213 g (0.006 moles) of PFMB and 0.1028 g (0.004 moles) of DCB, where the mixing ratio of PFMB and DCB was 6:4, were dissolved in 17.05 g of N,N-dimethylacetamide, resulting in a polyimide film having the formula (M) hereinabove.

EXAMPLE 11

The process of EXAMPLE 9 was followed except that 2.181 g (0.01 moles) of PMDA, 1.2809 g (0.004 moles) of PFMB and 0.1543 g (0.006 moles) of DCB, where the mixing ratio of PFMB and DCB was 4:6, were dissolved in 16.60 g of N,N-dimethylacetamide, resulting in a polyimide film having the formula (M) hereinabove.

EXAMPLE 12

The process of EXAMPLE 9 was followed except that 2.181 g (0.01 moles) of PMDA, 0.6404 g (0.002 moles) of PFMB and 0.2057 g (0.008 moles) of DCB, where the mixing ratio of PFMB and DCB was 2:8, were dissolved in 16.16 g of N,N-dimethylacetamide, resulting in a polyimide film having the formula (M) hereinabove.

Optical waveguides was fabricated using polyimide films obtained from EXAMPLES 1 through 12, and the refractive index of the optical waveguides with respect to a light beam having a wavelength of 1,550 nm was measured in both transverse electric (TE) and transverse magnetic (TM) modes. The results are shown in Table 1.

TABLE I

| Example No. | Refractive Index | |
|---|---|---|
| | TE mode | TM mode |
| Example 1 | 1.5176 | 1.5076 |
| Example 2 | 1.5714 | 1.5590 |
| Example 3 | 1.5263 | 1.1700 |
| Example 4 | 1.5370 | 1.5272 |
| Example 5 | 1.5476 | 1.5367 |
| Example 6 | 1.5607 | 1.5475 |
| Example 7 | 1.6021 | 1.4930 |
| Example 8 | 1.7213 | 1.5773 |
| Example 9 | 1.6239 | 1.5061 |
| Example 10 | 1.7004 | 1.5477 |
| Example 11 | 1.6723 | 1.5344 |
| Example 12 | 1.7022 | 1.5505 |

Table 1 shows that the optical waveguides manufactured using polyimide films from EXAMPLES 1 through 12 have a relatively higher refractive index compared to the use of conventional fluorinated polyimides providing a refractive index range of 1.519 to 1.566. Thus, the use of such polyimide films according to the present invention as a material for a core layer in optical waveguides will expand-theselection range of materials suitable for the cladding layer of the optical waveguide.

In addition, adhesive and coating properties, processibility, and optical absorption losses at 1,300 nm and 1.550 nm of polyimide films from EXAMPLES 1 through 12 were measured. To evaluate the adhesive and coating properties and the processibility of polyimide films, the appearance of films was observed immediately after the heating of silicon wafer for imidization, on which polyamic acid solution had been spin coated. Also, the surface of films was observed after scratching the films with a sharp object such as a knife. The observed result is that the adhesive and coating properties and processibility of polyimide films accordingto the present invention are better than those of conventional fluorinated polyimide films.

The optical absorption loss characteristics at a wavelength 1,300 nm and 1,500 nm were measured on the polyimide film from EXAMPLE 2 (indicated by Polyimide A in FIG. 1) and a sample for comparison (indicated by Polyimide B). The sample for comparison was fabricated from FDA and 4,4'-diaminobiphenyl (BP). The result is shown in FIG. 1. FIG. 1 shows that the optical absorption loss is less in Polyimide A than in Polyimide B at both 1,300 nm and 1,550 nm.

As described above, the polyimides for optical communications according to the present invention have a superior heat resistance, and can avoid the increase in optical absorption loss due to a refractive index increase and deterioration of adhesive and coating properties due to weak surface tension of a polyimide film. In addition, use of the polyimides as a material for a core layer of optical waveguides can expand the selection range of material for the cladding layer of the optical waveguide.

What is claimed is:

1. A compound for optical communications, said compound having the formula:

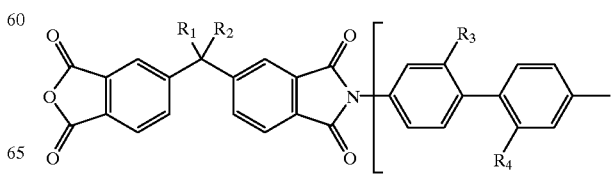

-continued

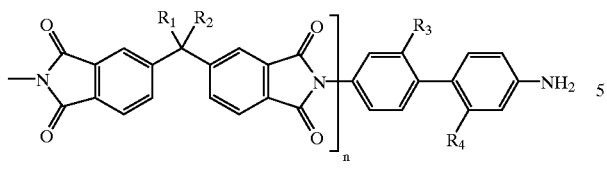

where $R_1$ and $R_2$ are independently selected from $CF_3$, $CCl_3$, unsubstituted aromatic group and halogenated aromatic group; $R_3$ and $R_4$ are independently selected from Cl, F, I, Br, $CCl_3$, unsubstituted aromatic group and halogenated aromatic group; and n is an integer from 0 to 38.

2. The compound of claim 1, said groups $R_1$ and $R_2$ each being $CF_3$ and said groups $R_3$ and $R_4$ each being Cl.

3. A composition of matter comprising compounds of claim 1, said composition of matter having a weight-averaged molecular weight in the range of approximately 10000 to 50000.

4. A composition of matter comprising compounds of claim 1, said composition of matter having a weight-averaged molecular weight in the range of approximately 10000 to 50000.

5. A composition of matter comprising compounds of claim 2, said composition of matter having a weight-averaged molecular weight in the range of approximately 10000 to 50000.

6. A compound for optical communications, said compound having the formnula:

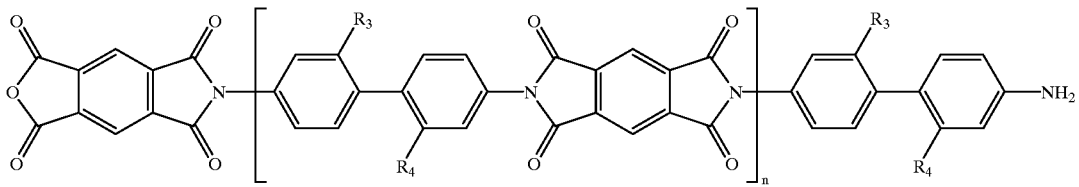

where $R_3$ and $R_4$ are independently selected from Cl, F, I, Br, $CCl_3$, unsubstituted aromatic group and halogenated aromatic group; and n is an integer from 0 to 38.

7. The compound of claim 6, said groups $R_3$ and $R_4$ each being Cl.

8. A composition of matter comprising compounds of claim 6, said composition of matter having a weight-averaged molecular weight in the range of approximately 10000 to 50000.

9. A composition of matter comprising compounds of claim 7, said composition of matter having a weight-averaged molecular weight in the range of approximately 10000 to 50000.

10. A composition of matter comprising compounds of claim 8, said composition of matter having a weight-averaged molecular weight in the range of approximately 10000 to 50000.

11. A compound for optical communications, comprising: a first unit having the formula:

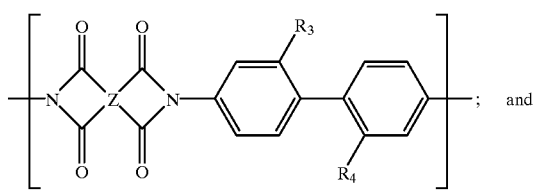

a second unit having the formula:

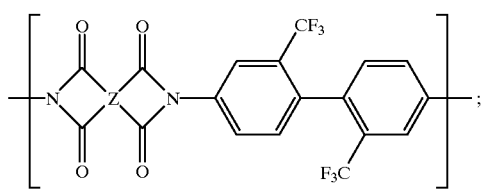

where $R_3$ and $R_4$ are independently selected from Cl, F, I, Br, $CCl_3$, unsubstituted aromatic group and halogenated aromatic group;

Z is selected from radicals of formula:

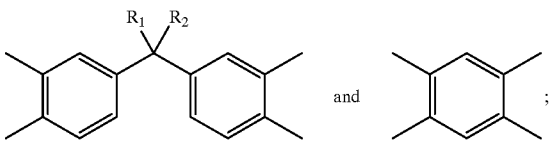

where $R_1$ and $R_2$ are independently selected from $CF_3$, $CCl_3$, unsubstituted aromatic group and halogenated aromatic group; and where the sum of the number of said first units and said second units in said compound is in the range of 2 to 38.

12. The compound of claim 11, said group Z being:

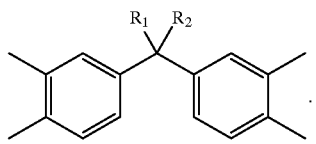

13. The compound of claim 12, said groups $R_3$ and R4 each being Cl.

14. The compound of claim 11, said group Z being

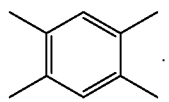

15. The compound of claim 14, said groups $R_3$ and $R_4$ each being Cl.

16. A composition of matter comprising compounds of claim 11, said composition of matter having a weight-averaged molecular weight in the range of approximately 10000 to 50000.

17. A composition of matter comprising compounds of claim 12, said composition of matter having a weight-averaged molecular weight in the range of approximately 10000 to 50000.

18. A composition of matter comprising compounds of claim 14, said composition of matter having a weight-averaged molecular weight in the range of approximately 10000 to 50000.

19. The composition of matter of claim 1, said composition further characterized in having values of refractive index, at 1550 nm, in the transverse electric mode in the range of approximately 1.5176 to 1.5714 and in the transverse magnetic mode in the range of approximately 1.5076 to 1.5590.

20. The composition of matter of claim 6, said composition further characterized in having values ofrefractive index, at 1550 nm, in the transverse electric mode in the range of approximately 1.6021 to 1.7213 and in the transverse magnetic mode in the range of approximately 1.4390 to 1.5773.

21. A method of preparing a composition for use in optical communications, comprising the steps of:

dissolving 2,2-bis(dicarboxyphenyl)hexafluoropropane and 2,2'-dichloro-4,4'-diaminobiphenyl in dimethylacetamide in a nitrogen atmosphere and allowing the reagents to react to form a reaction solution;

after an interval of time, working up the reaction solution to yield a polyamic acid solution;

spin-coating the polyamic acid solution on a silicon wafer; and heating the spin-coated wafer successively at approximately 100° C., 200° C., and 350° C. to form a polyimide film.

22. The method of claim 21, said dissolving step further comprising:

additionally dissolving a 2,2'-bis(substituted) derivative of 4,4'-diaminobiphenyl different from 2,2'-dichloro-4,4'-diaminobiphenyl in the reaction solution.

23. The method of claim 21, said dissolving step further comprising dissolving 2,2'-bis(trifluoromethyl)4,4'-diaminobiphenyl in the reaction solution.

24. The method of claim 23, the mole ratio of bis(trifluoromethyl)-4,4'-diaminobiphenyl to 2,2'-dichloro-4,4'-diaminobiphenyl being in the range of approximately 8:2 to 2:8.

25. A method of preparing a composition for use in optical communications, comprising the steps of:

dissolving 1,2,4,5-benzenetetacarboxylic dianhydride and a 2,2'-bis(substituted) derivative of 4,4'-diaminobiphenyl in dimethylacetamide in a nitrogen atmosphere and allowing the reagents to react to form a reaction solution;

after an interval of time, working up the reaction solution to yield a polyamic acid solution;

spin-coating the polyamic acid solution on a silicon wafer; and heating the spin-coated wafer successively at approximately 100° C., 200° C., and 350° C. to form a polyimide film.

26. The method of claim 25, said 2,2'-bis(substituted) derivative of 4,4'-diaminobiphenyl being 2,2'-bis(trifluoromethyl)-4,4'-diaminobiphenyl.

27. The method of claim 25, said 2,2'-bis(substituted) derivative of 4,4'-diaminobiphenyl being 2,2'-dichloro-4,4'-diaminobiphenyl.

28. The method of claim 25, said dissolving step further comprising:

additionally dissolving a second 2,2'-bis(subsfituted) derivative of 4,4'-diaminobiphenyl in the reaction solution.

29. The method of claim 28, said 2,2'-bis(substituted) derivatives being 2,2'-bis(trifluoromethyl)-4,4'-diaminobiphenyl and 2,2'-dichloro-4,4'-diaminobiphenyl.

30. The method of claim 29, the mole ratio of bis(trifluoromethyl)-4,4'-diaminobiphenyl to 2,2'-dichloro-4,4'-diaminobiphenyl being in the range of approximately 8:2 to 2:8.

* * * * *